(12) United States Patent
Sugino

(10) Patent No.: US 10,236,101 B2
(45) Date of Patent: Mar. 19, 2019

(54) GROMMET AND WIRE HARNESS WITH GROMMET

(71) Applicant: Sumitomo Wiring Systems, Ltd., Yokkaichi, Mie (JP)

(72) Inventor: Hidetoshi Sugino, Mie (JP)

(73) Assignee: Sumitomo Wiring Systems, Ltd., Yokkaichi, Mie (JP)

(*) Notice: Subject to any disclaimer, the term of this patent is extended or adjusted under 35 U.S.C. 154(b) by 5 days.

(21) Appl. No.: 15/826,313

(22) Filed: Nov. 29, 2017

(65) Prior Publication Data

US 2018/0174718 A1 Jun. 21, 2018

(30) Foreign Application Priority Data

Dec. 21, 2016 (JP) .................................. 2016-247349

(51) Int. Cl.
  *H01B 17/58* (2006.01)
  *B60R 16/02* (2006.01)
  *H01B 7/00* (2006.01)
  *H02G 3/06* (2006.01)

(52) U.S. Cl.
  CPC ....... *H01B 17/583* (2013.01); *B60R 16/0222* (2013.01); *H01B 7/0045* (2013.01); *H02G 3/06* (2013.01)

(58) Field of Classification Search
  CPC .. B60R 16/0222; H01B 7/0045; H01B 17/583
  USPC ............ 174/68.1, 72 A, 73.1, 76, 91, 92, 93
  See application file for complete search history.

(56) References Cited

U.S. PATENT DOCUMENTS

| 6,010,134 | A | * | 1/2000 | Katoh | ................. B60R 16/0222 |
| | | | | | 174/152 G |
| 9,515,467 | B2 | * | 12/2016 | Nakai | ................. H02G 3/0691 |
| 2007/0267212 | A1 | * | 11/2007 | Nachbauer | .......... B60R 16/0207 |
| | | | | | 174/70 R |
| 2016/0126709 | A1 | | 5/2016 | Maeda | |

FOREIGN PATENT DOCUMENTS

JP  10213272 A  *  8/1998
JP  2016092979 A     5/2016

* cited by examiner

*Primary Examiner* — Timothy J Thompson
*Assistant Examiner* — Charles Pizzuto
(74) *Attorney, Agent, or Firm* — Reising Ethington, P.C.

(57) ABSTRACT

A grommet and a wire harness with a grommet are provided. The grommet is for attachment to the joint between tube members into which electrical wires are inserted, and includes a main body portion that is formed by a material that has elasticity and is shaped as a tube capable of coming into close contact with the tube members. The main body portion has a pair of divided bodies that are obtained dividing the main body portion such that the interior of the main body portion is open over the entire length thereof. Mating surfaces of the pair of divided bodies are fixed to each other in a liquid-tight manner.

5 Claims, 6 Drawing Sheets

GROMMET AND WIRE HARNESS WITH GROMMET

CROSS REFERENCE TO RELATED APPLICATIONS

This application claims the priority of Japanese patent application JP2016-247349 filed on Dec. 21, 2016, the entire contents of which are incorporated herein.

TECHNICAL FIELD

The present invention relates to a grommet and a wire harness with a grommet.

BACKGROUND ART

Conventionally, a grommet is known that is attached to the joint between tube members in which electrical wires are inserted, and prevents the intrusion of water into the tube members through the joint. For example, in a wire harness disclosed in JP 2016-92979A, a grommet is attached to the joint between a corrugated tube and a shield pipe in which a plurality of electrical wire are collectively inserted. The corrugated tube encloses and protects a braided member that is connected to an end portion of the shield pipe. The grommet is tubular, with one end fitted around the end portion of the shield pipe, and the other end fitted around an end portion of the corrugated tube. The two end portions of the grommet are fastened with clamping bands, and are elastically in close contact with the shield pipe and the corrugated tube.

The grommet described above is attached at a predetermined position after performing the operations of inserting electrical wires into the shield pipe, attaching the braided member to the end portion of the shield pipe by crimping, and then covering the braided member with the corrugated tube. During the above-described operations, the grommet is arranged on the shield pipe or on the corrugated tube side, and then moved in the axial direction after the above-described operations and attached at a predetermined position.

JP 2016-92979A is an example of related art.

SUMMARY

However, the operation of attaching the grommet having the above configuration is very difficult. The reason for this is that the series of operations of attaching the grommet around the shield pipe or the corrugated tube, sliding the grommet to the predetermined position, fitting the grommet around the end portion of the shield pipe or the corrugated tube, and the like need to be performed while pushing the grommet so as to be widened.

The present design was achieved in light of the above-described situation, and an object of the present design is to provide a grommet and a wire harness with a grommet that enable the attachment operation to be performed easily.

A grommet according to an aspect of the present design is a grommet for attachment to a joint between tube members into which an electrical wire is inserted, the grommet including: a main body portion that is formed by a material that has elasticity, and is shaped as a tube capable of coming into close contact with the tube members, wherein the main body portion has a pair of divided bodies obtained by dividing the main body portion such that an interior of the main body portion is open over an entire length thereof, and mating surfaces of the pair of divided bodies are fixed to each other in a liquid-tight manner. A wire harness with a grommet according to an aspect of the present design includes an electrical wire, a tube member into which the electrical wire is inserted, and the above-described grommet.

According to the present design, the grommet can be attached by sandwiching the tube members, into which the electrical wire is inserted, between the pair of divided bodies.

EMBODIMENTS

Figure 1:
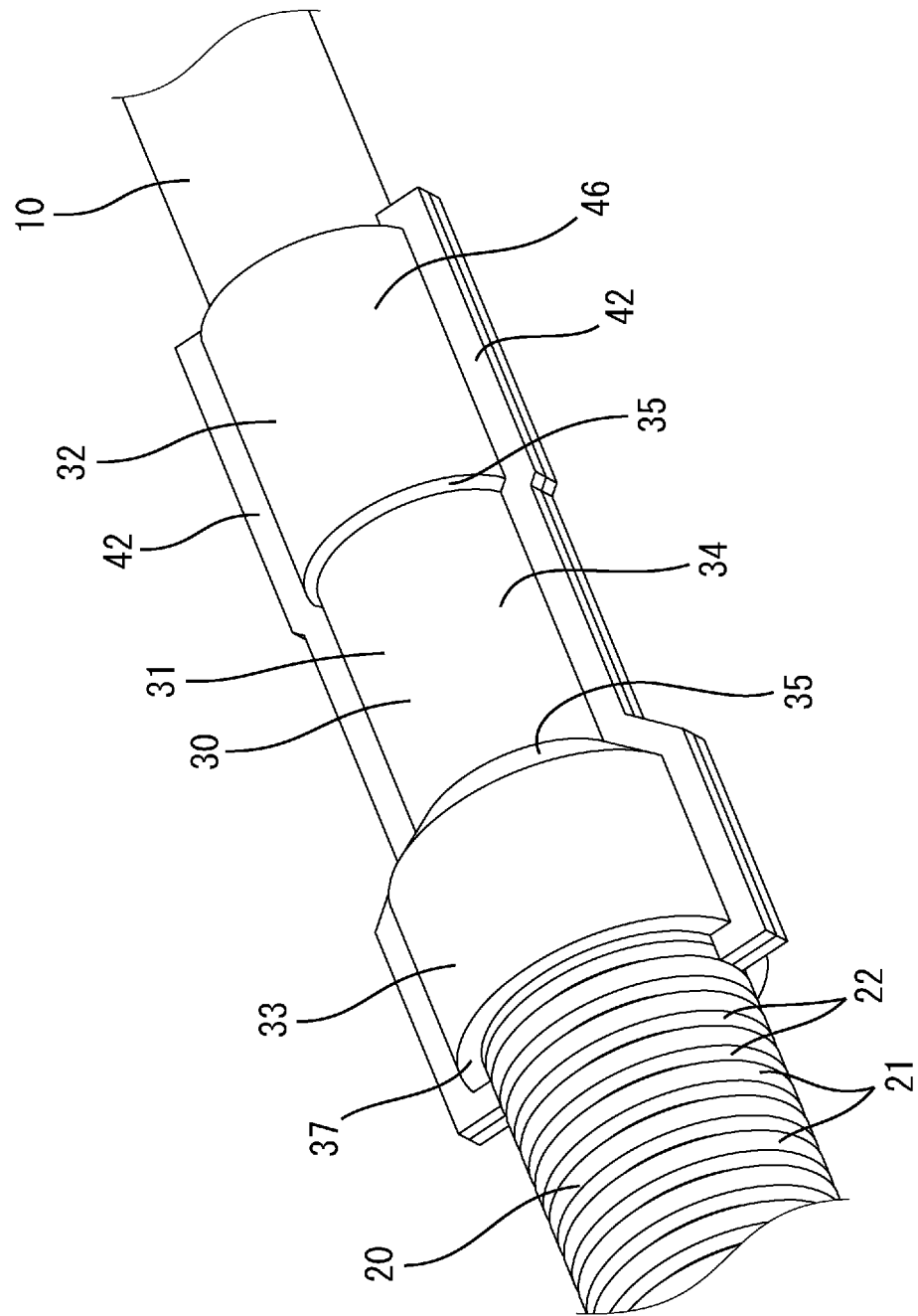
FIG. 1 is an enlarged partial perspective view of a wire harness according to an embodiment of the present design, and shows a state in which a grommet is attached.
Figure 2:
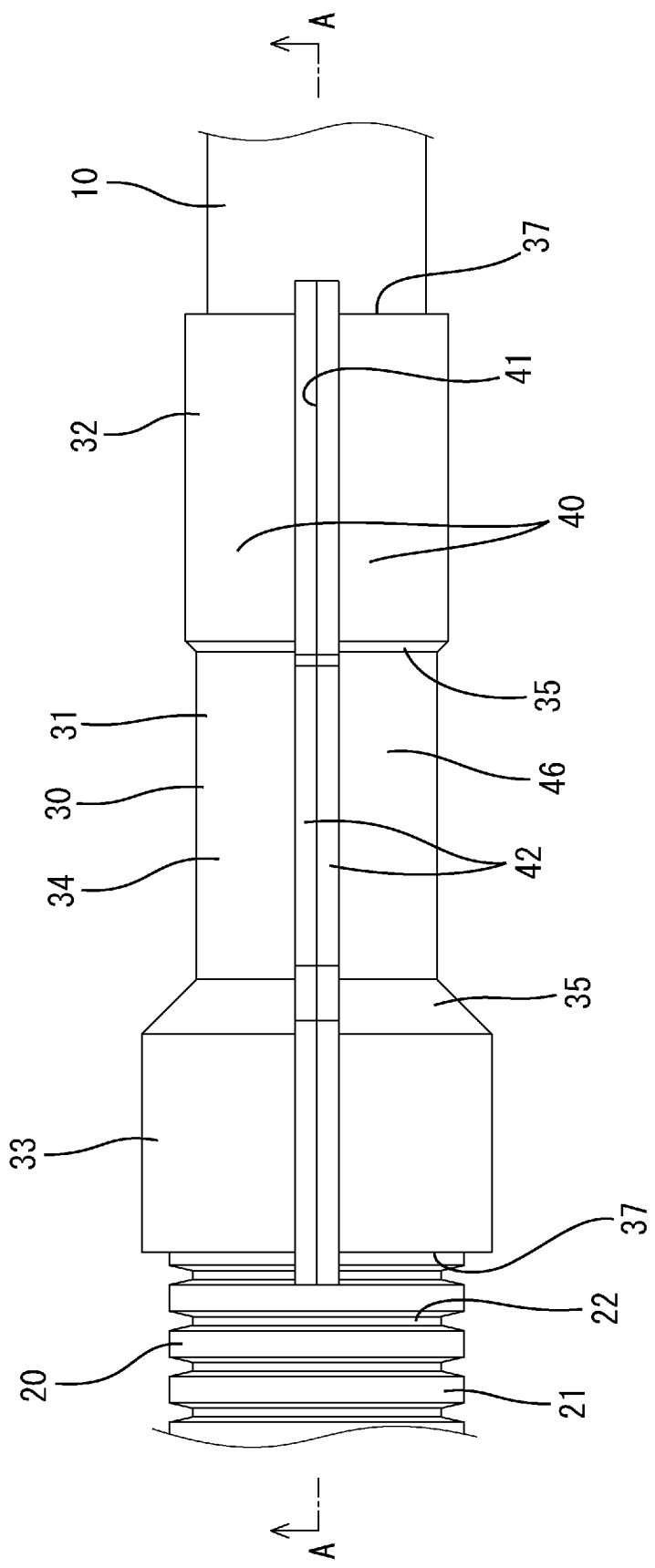
FIG. 2 is an enlarged partial side view of the wire harness in a state where the grommet is attached.

Preferred embodiments of the present design are described below.

In the grommet according to an aspect of the present design, the main body portion may include a projection portion that is to be fitted into a hole portion provided in a tube member among the tube members. According to this configuration, by fitting the projection portion into the hole portion, the grommet is positioned in the axial direction and the circumferential direction, thus making it possible to eliminate the need for a band fastening operation.

Also, in the grommet according to an aspect of the present design, the mating surfaces may each be provided in a manner of projecting outward in a diameter direction from an outer circumferential surface of the main body portion. According to this configuration, it is possible to increase the size of the mating surfaces over the entire length of the main body portion compared to the case where the size of the mating surfaces is equal to the thickness of the main body portion, thus making it possible to firmly fix the two divided bodies to each other.

Also, in the grommet according to an aspect of the present design, the mating surfaces may each be provided in a manner of projecting outward in an axial direction from an end surface in an axial direction of the main body portion. According to this configuration, it is possible to increase the size of the mating surfaces at the end portions of the main body portion, thus making it possible to even more firmly fix the two divided bodies to each other.

EMBODIMENTS

Hereinafter, embodiments of the present design will be described in detail with reference to FIGS. 1 to 6.

A wire harness of the present embodiment is for installation in a hybrid vehicle or the like, and is for connecting a device such as a battery that is installed in the rear portion of the vehicle to a device such as an inverter that is installed in the front portion of the vehicle. The majority of the wire harness is routed under the floor of the vehicle.

The wire harness includes a plurality of (two in the present embodiment) electrical wires W, a pipe 10 and a corrugated tube (tube member) 20 into which the electrical wires W are inserted, and a grommet 30 that is attached to the joint between the pipe 10 and the corrugated tube 20.

The electrical wires W are ordinary flexible electrical wires. Terminal fittings (not shown) are connected to the end portions of the electrical wires, and the terminal fittings are housed in connectors (not shown) that can be connected to devices.

Intermediate portions of the electrical wires W are inserted into the pipe 10. The pipe 10 is made of a metal (copper or a copper alloy, aluminum or an aluminum alloy, etc.), and has a shield function of blocking electromagnetic noise generated by the electrical wires W inserted therein and a protection function of protecting the electrical wires W from flying rocks and the like in the case of being routed under the floor. The pipe 10 is elongated and has a true circular cross-section, and is bent into a predetermined shape so as to follow the routing path of the wire harness. The majority of the pipe 10 is arranged approximately horizontally in the front-back direction under the floor of the vehicle.

Figure 5:
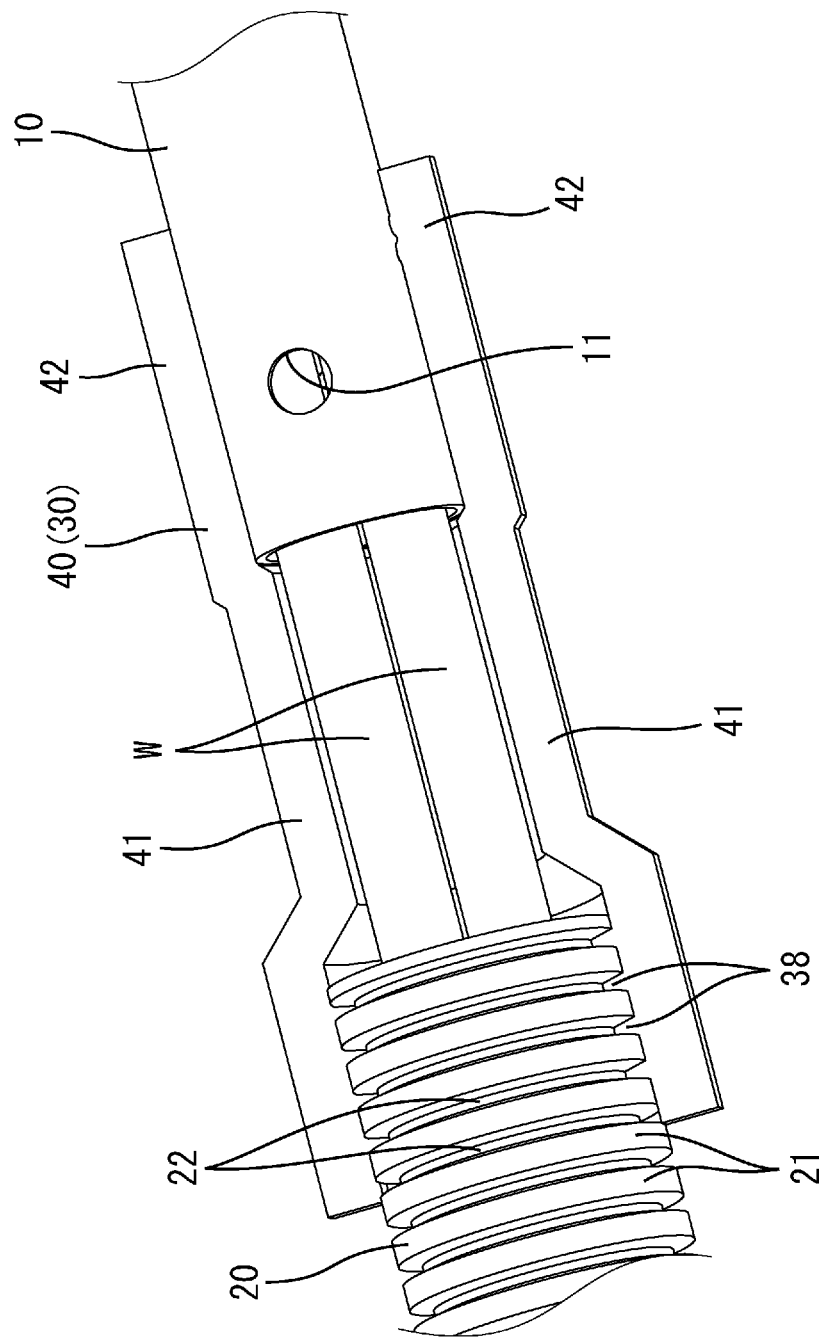
FIG. 5 is an enlarged partial perspective view of the wire harness in a state where a divided body is attached.
Figure 6:
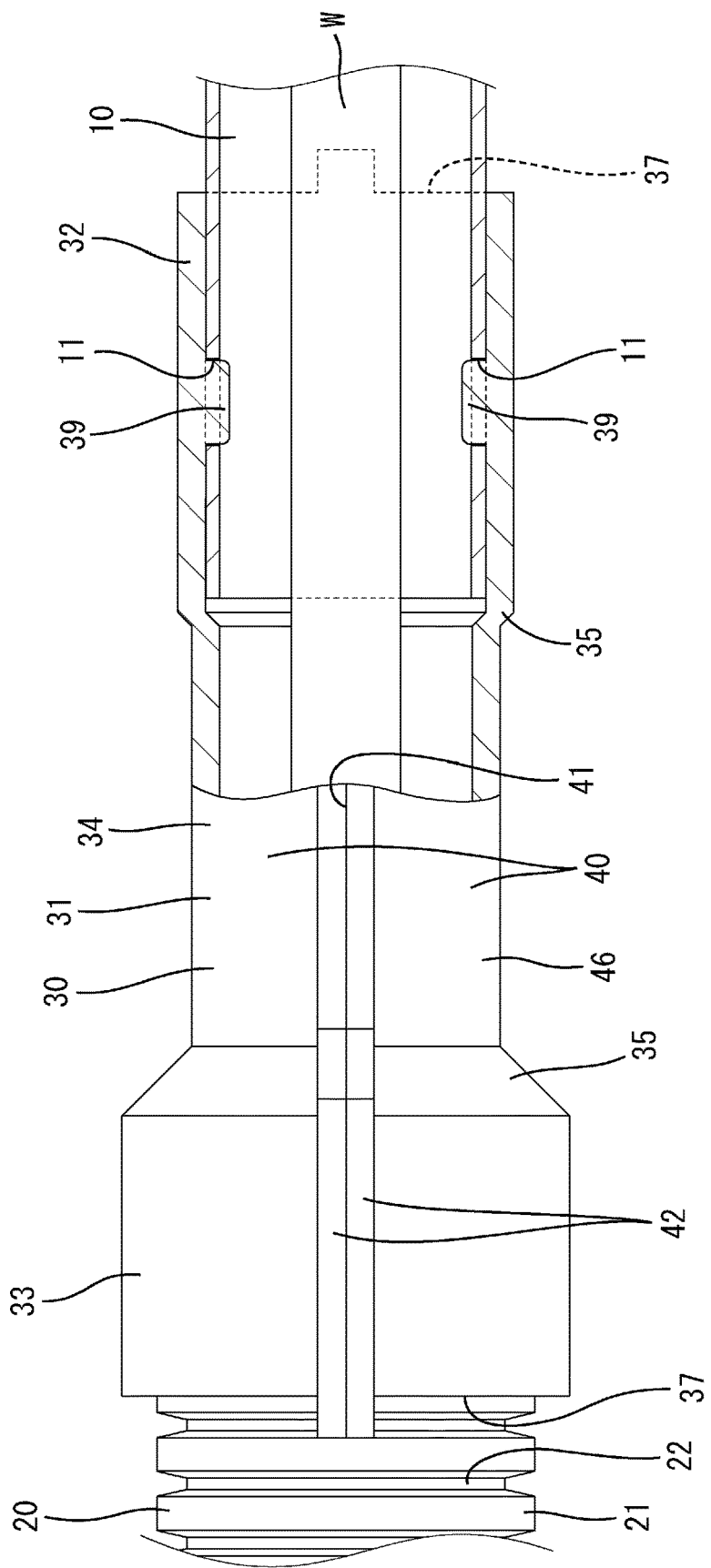
FIG. 6 is a partially-cutaway cross-sectional view of a state where the grommet is positioned.

As shown in FIGS. 5 and 6, hole portions 11 to which the grommet 30 can be fixed are provided in an end portion of the pipe 10. The hole portions 11 are circular and pass through the pipe 10 in the thickness direction (inward-outward direction). A pair of hole portions 11 are provided at positions that oppose each other across the centerline of the pipe 10. The two hole portions 11 have the same shape, and are symmetrical about the centerline of the pipe 10.

A flexible shield member (not shown) is connected to the end portion of the pipe 10. The flexible shield member encloses the portions of the electrical wires W that are lead out from the pipe 10, and blocks electromagnetic noise generated by the electrical wires W. The flexible shield member is a braided member formed by braiding metal strands into a tubular shape, metal tape, or the like, and has favorable flexibility. One end portion of the flexible shield member is fixed to the end portion of the pipe 10, and the other end portion is connected to a connector.

The corrugated tube 20 covers the outer circumferential side of the flexible shield member and protects the flexible shield member. The corrugated tube 20 is made of a synthetic resin, and is tubular with no cuts over the entire circumference. The corrugated tube 20 is bellows-shaped, with mountain portions 21 and valley portions 22 that are alternatingly connected in the axial direction.

The grommet 30 is formed by a material that has elasticity (rubber, an elastomer, etc.). The grommet 30 has a main body portion 31 that is shaped as a tube capable of coming into close contact with the pipe 10 and the corrugated tube 20.

As shown in FIG. 1, one end portion of the main body portion 31 is a first mating portion 32 that can be fitted around the end portion of the pipe 10, and the other end portion is a second mating portion 33 that can be fitted around the end portion of the corrugated tube 20. The first mating portion 32, the second mating portion 33, and an intermediate portion 34 between the first mating portion 32 and the second mating portion 33 are each shaped as a circular tube. The first mating portion 32 has a smaller diameter than the second mating portion 33, and the intermediate portion 34 has a smaller diameter than the first mating portion 32 and the second mating portion 33. A level difference portion 35 is formed between the first mating portion 32 and the intermediate portion 34, and between the second mating portion 33 and the intermediate portion 34.

Figure 4:
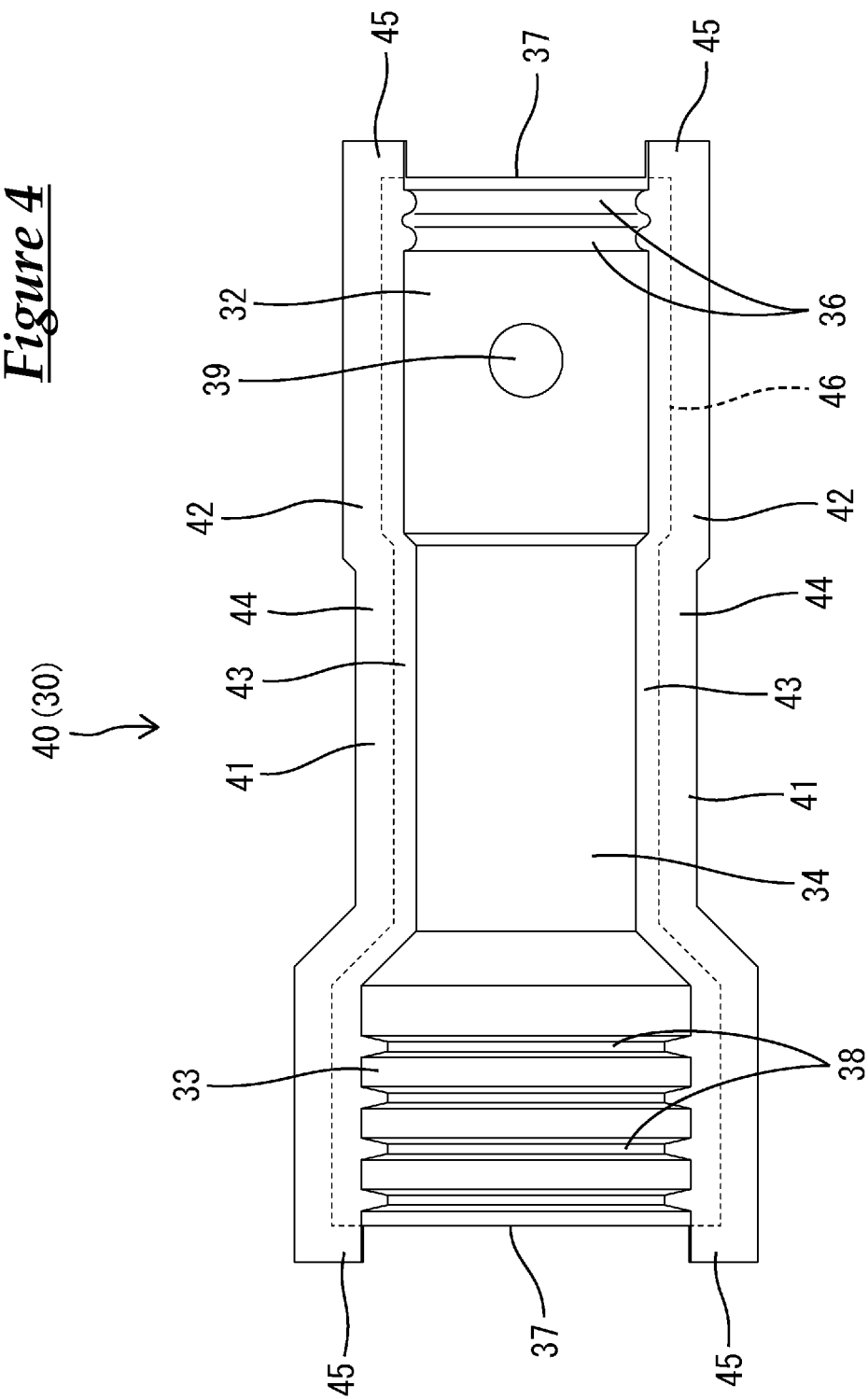
FIG. 4 is a plan view of a divided body.

Water stop lips 36 that can come into close contact with the outer circumferential surface of the pipe 10 are provided in the first mating portion 32 (see FIG. 4). The water stop lips 36 project inward over the entire circumference of the inner peripheral surface of the first mating portion 32. A plurality of (two in the present embodiment) water stop lips 36 are provided. The water stop lips 36 have the same projecting dimension. The water stop lips 36 are located slightly inward of an end surface 37 of the main body portion 31 on the first mating portion 32 side.

Figure 3:
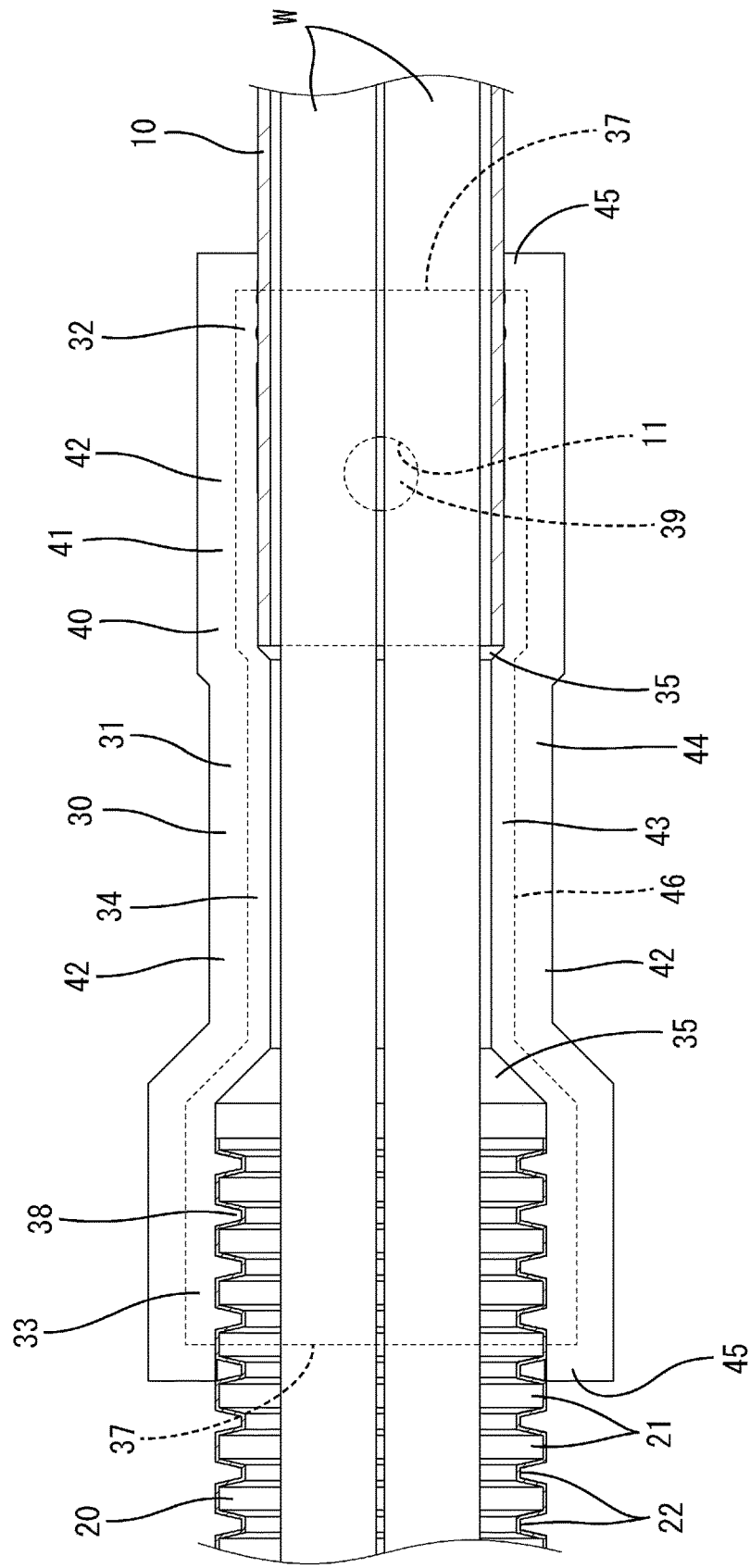
FIG. 3 is an enlarged partial cross-sectional view of the wire harness in a state where the grommet is attached, and this cross-sectional view corresponds to a cross-section taken along A-A in FIG. 2.

Locking projections 38 that can fit into valley portions 22 of the corrugated tube 20 are provided on the second mating portion 33 (see FIG. 3). The locking projections 38 project inward over the entire circumference of the inner peripheral surface of the second mating portion 33. A plurality of (four in the present embodiment) locking projections 38 are provided. The locking projections 38 are arranged at equal intervals conforming to the intervals between the valley portions 22 of the corrugated tube 20. The locking projections 38 are located slightly inward of the end surface 37 of the main body portion 31 on the second mating portion 33 side (see FIG. 4).

Projection portions 39 that can fit into the hole portions 11 of the pipe 10 are provided on the main body portion 31. The projection portions 39 project from the inner peripheral surface of the first mating portion 32. The projection portions 39 are located inward of the water stop lips 36 on the first mating portion 32 (located in a central region in the axial direction), or in other words are located at the center in the axial direction of the mating portion 32. The projection portions 39 have a circular cross-section that matches the hole portions 11. The projecting dimension of the projection portions 39 is the same as the thickness of the pipe 10 or slightly larger than the thickness of the pipe 10. A pair of projection portions 39 are provided at positions that oppose each other across the centerline of the first mating portion 32. The two projection portions 39 have the same shape, and are symmetrical about the centerline of the first mating portion 32.

The main body portion 31 has a pair of divided bodies 40 obtained by dividing the main body portion 31 such that the interior thereof is open over the entire length, and mating surfaces 41 of the pair of divided bodies 40 are fixed together in a liquid-tight manner. The pair of divided bodies 40 are obtained by dividing the main body portion 31 in approximately half, and the divided bodies 40 each have a semicircular cross-section. The two end portions (mating surfaces 41), in the width direction, of each of the pair of divided bodies 40 are mated together to constitute the main body portion 31. The pair of divided bodies 40 have the same shape, and are obtained by dividing the main body portion 31 such that the projection portions 39 are located at the center in the width direction.

The divided bodies 40 each have projecting edge portions 42 that project horizontally (direction orthogonal to the divided body 40 mating direction) along the mating surfaces 41. The projecting edge portions 42 project approximately perpendicularly to an outer circumferential surface 46 of the main body portion 31. The projecting edge portions 42 are shaped as thin plates that are continuous with the divided body 40 over the entire length thereof. Also, the projecting edge portions 42 project outward in the axial direction from the two end surfaces 37 of the main body portion 31. Surfaces of the projecting edge portions 42 on one side constitute portions of the mating surfaces 41 of the pair of divided bodies 40, and thus have a function of increasing the size of the mating surfaces 41 by an amount corresponding to the thickness of the main body portion 31.

As shown in FIG. 4, the mating surfaces 41 each include a portion having a width the same as the thickness of the main body portion 31 (referred to hereinafter as a first mating portion 43), a portion that projects outward in the diameter direction from the outer circumferential surface 46 of the main body portion 31 (referred to hereinafter as a second mating portion 44), and portions that project outward in the axial direction from the end surfaces 37 in the axial direction of the main body portion 31 (referred to hereinafter as third mating portions 45). The second mating portion 44 and the third mating portions 45 are constituted by one surface of the projecting edge portion 42.

The first mating portion 43 and the second mating portion 44 extend over the entire length of the portion that constitutes the main body portion 31 in each of the end portions in the width direction of the divided body 40. The axial direction dimension of the third mating portions 45 (dimension of projection from the end surfaces 37 of the main body portion 31) is the same as the width of the second mating portion 44 (dimension of projection from the outer circumferential surface 46 of the main body portion 31). Also, the diameter direction dimension of the third mating portions 45 (dimension in the up-down direction in FIG. 4) is the same as the total of the diameter direction dimensions of the first mating portion 43 and the second mating portion 44 (dimension in the up-down direction in FIG. 4). Accordingly, the width of the mating surface 41, which includes the first mating portion 43, the second mating portion 44, and the third mating portions 45, is approximately constant over the entire length. Note that the mating surface 41 is an approximately horizontal surface with no level differences over the entirety thereof.

Next, an example of an operation for attaching the grommet 30 to the wire harness in the present embodiment will be described. In advance, a plurality of electrical wires W are inserted into the pipe 10, the portions of the electrical wires W that are lead out from the pipe 10 are inserted into the flexible shield member, the flexible shield member is fixed to the end portion of the pipe 10, and the corrugated tube 20 is fitted around the flexible shield member.

First, one divided body 40 out of the pair of divided bodies 40 is attached to the wire harness (see FIG. 5). The first mating portion 32 is mated to the end portion of the pipe 10, and the second mating portion 33 is mated to the end portion of the corrugated tube 20. At this time, the projection portion 39 is fitted into one of the hole portions 11 of the pipe 10. The projection portion 39 is fitted into the hole portion 11 with substantially no gap therebetween, and thus the divided body 40 is attached in a state where positional shift in the axial direction and the diameter direction relative the end portion of the pipe 10 is restricted.

Also, the locking projections 38 are fitted into valley portions 22 of the corrugated tube 20. Mountain portions 21 of the corrugated tube 20 fit between the locking projections 38, and thus the divided body 40 is attached in a state where positional shift in the axial direction relative to the end portion of the corrugated tube 20 is restricted. Note that in the state where the divided body 40 is attached to the wire harness, the water stop lips 36 abut against the outer circumferential surface of the pipe 10.

Next, the other divided body 40 is attached to the wire harness. Similarly to the above-described divided body 40, the first mating portion 32 is mated to the end portion of the pipe 10 while fitting the projection portion 39 into the other hole portion 11 of the pipe 10, and the second mating portion 33 is mated to the end portion of the corrugated tube 20 while fitting the locking projections 38 into valley portions 22 of the corrugated tube 20.

Next, the two divided bodies 40 are mated to each other. The two divided bodies 40 are adhered to each other by applying an adhesive to the mating surfaces 41, or are adhered together after the mating surfaces 41 of the two divided bodies 40 are joined to each other. At this time, the two divided bodies 40 are mated in a state of being elastically widened (stretched in the circumferential direction).

By mating the two divided bodies 40 to each other, the water stop lips 36 become entirely closed (connected) and elastically crushed so as to be in close contact with the outer circumferential surface of the pipe 10, thus preventing water from entering between the grommet 30 and the pipe 10. Also, due to the pair of projection portions 39 being fitted into the hole portions 11 of the pipe 10, the grommet 30 is fixed to the end portion of the pipe 10. Inward-directed force acts on the projection portions 39 due to the elastic force in the diameter shrinking direction of the main body portion 31, and therefore the mated state of the projection portions 39 and the hole portions 11 is firmly maintained.

Also, due to the two divided bodies 40 being mated to each other, the locking projections 38 become entirely closed (connected) and fit into valley portions 22 of the corrugated tube 20, thus preventing water from entering between the grommet 30 and the corrugated tube 20, and fixing the grommet 30 to the end portion of the corrugated tube 20. Inward-directed force acts on the locking projections 38 due to the elastic force in the diameter shrinking direction of the main body portion 31, and therefore the mated state of the locking projections 38 and the valley portions 22 is firmly maintained.

In this way, the operation of attaching the grommet 30 to the wire harness is complete.

Next, actions and effects of the embodiment having the above configuration will be described.

The wire harness of the present embodiment includes electrical wires W, the pipe 10 and the corrugated tube 20 into which the electrical wires W are inserted, and the grommet 30 that is attached to the joint between the pipe 10 and the corrugated tube 20. The grommet 30 has the main body portion 31 that is formed by a material that has elasticity, and is shaped as a tube capable of coming into close contact with the pipe 10 and the corrugated tube 20, the main body portion 31 has the pair of divided bodies 40 obtained by dividing the main body portion 31 such that the interior thereof is open over the entire length, and the mating surfaces 41 of the pair of divided bodies 40 are fixed together in a liquid-tight manner.

According to this configuration, the grommet 30 can be attached such that the pipe 10 and the corrugated tube 20, into which the electrical wires W are inserted, are sandwiched between the pair of divided bodies 40, thus making it possible to easily perform the attachment operation.

Also, the main body portion 31 includes the projection portions 39 that can fit into the hole portions 11 provided in the pipe 10. According to this configuration, the projection portions 39 are fitted into the hole portions 11, thus positioning the grommet 30 in the axial direction and the circumferential direction, thereby making it possible to eliminate the need for a band fastening operation.

Additionally, the main body portion 31 includes the locking projections 38 that can fit into valley portions 22 of the corrugated tube 20. According to this configuration, the locking projections 38 are fitted into the valley portions 22, thus positioning the grommet 30 in the axial direction, thereby making it possible to eliminate the need for a band fastening operation.

Accordingly, there is no need for a fixing means such as a clamping band or tape in order to prevent shifting of the grommet 30, thus making it possible to reduce the number of parts.

Also, the mating surfaces 41 are provided in a manner of projecting outward in the diameter direction from the outer circumferential surface 46 of the main body portion 31. According to this configuration, it is possible to increase the size of the mating surfaces 41 over the entire length of the main body portion 31 compared to the case where the size of the mating surfaces is equal to the thickness of the main body portion 31, thus making it possible to firmly fix the two divided bodies 40 to each other.

Also, the mating surfaces 41 are provided in a manner of projecting outward in the axial direction from the end surfaces 37 in the axial direction of the main body portion 31. According to this configuration, it is possible to increase the size of the mating surfaces at the end portions of the main body portion 31, thus making it possible to even more firmly fix the two divided bodies 40 to each other.

OTHER EMBODIMENTS

The present invention is not limited to the embodiment described above using the foregoing description and drawings, and embodiments such as the following are also encompassed in the technical scope of the present invention.

Although the pipe 10 includes a shield function and a protection function in the above embodiment, the present invention is not limited to this, and the pipe may include only a protection function, such as the case of a tube member that is made of a synthetic resin.

Although the pipe 10 is a metal tube in the above embodiment, the present invention is not limited to this, and the pipe may be a structure in which a metal foil is concentrically embedded in a resin pipe, for example.

In the above embodiment, an example is described in which the tube members are the pipe 10 that is superior in terms of shape holding capability and the corrugated tube 20 that is superior in terms of flexibility, but the present invention is not limited to this, and the tube members may both be a shape holding member that is superior in terms of shape holding capability, or both be a flexible member that is superior in terms of flexibility.

Although the divided bodies 40 have the same shape in the above embodiment, the divided bodies are not necessary required to have the same shape.

Although the projection portion 39 and the hole portion 11 are each provided in pairs in the above embodiment, the present invention is not limited to this, and a configuration is possible in which one projection portion and one hole portion are provided, or three or more of each are provided.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A grommet for attachment to a joint between tube members into which an electrical wire is inserted, the grommet comprising:
   a main body portion that is formed by a material that has elasticity, and is shaped as a tube capable of coming into close contact with the tube members,
   wherein the main body portion has a pair of divided bodies obtained by dividing the main body portion such that an interior of the main body portion is open over an entire length thereof, and
   mating surfaces of the pair of divided bodies are fixed to each other in a liquid-tight manner, wherein the mating surfaces are each provided in a manner of projecting outward in a diameter direction from an outer circumferential surface of the main body portion.

2. The grommet according to claim 1, wherein the main body portion includes a projection portion that is to be fitted into a hole portion provided in a tube member among the tube members.

3. A wire harness with a grommet, comprising:
   an electrical wire;
   tube members into which the electrical wire is inserted; and
   the grommet according to claim 1.

4. A grommet for attachment to a joint between tube members into which an electrical wire is inserted, the grommet comprising:
   a main body portion that is formed by a material that has elasticity, and is shaped as a tube capable of coming into close contact with the tube members,
   wherein the main body portion has a pair of divided bodies obtained by dividing the main body portion such that an interior of the main body portion is open over an entire length thereof, and
   mating surfaces of the pair of divided bodies are fixed to each other in a liquid-tight manner;
   wherein the mating surfaces are each provided in a manner of projecting outward in an axial direction from an end surface in an axial direction of the main body portion.

5. A wire harness with a grommet, comprising:
   an electrical wire;
   tube members into which the electrical wire is inserted; and
   the grommet according to claim 4.

* * * * *